No. 659,346.  
P. KING.  
DEVICE FOR SQUEEZING LIMES, LEMONS, &c.  
(Application filed Mar. 2, 1900.)  
(No Model.)
Patented Oct. 9, 1900.
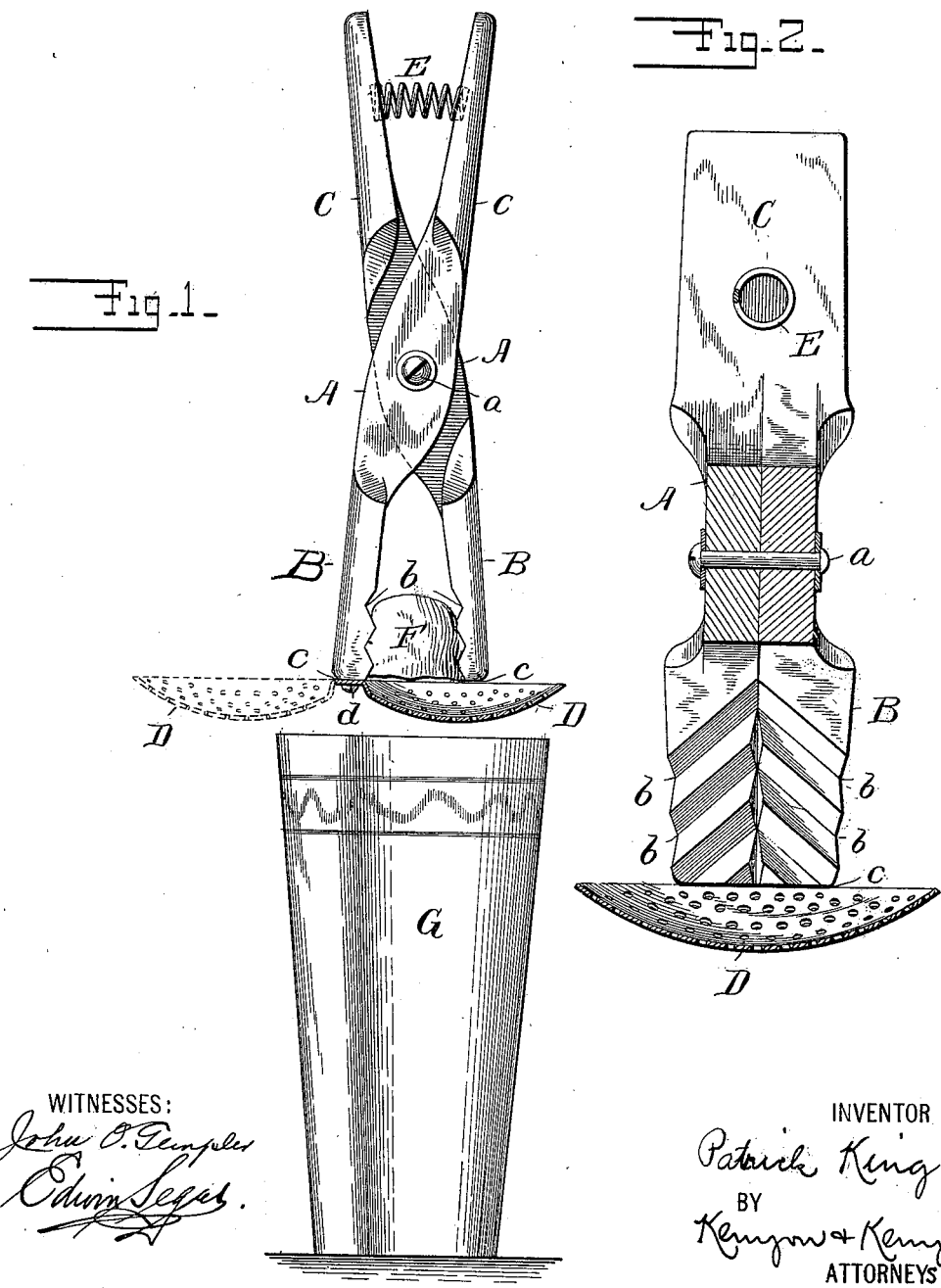

UNITED STATES PATENT OFFICE.

PATRICK KING, OF NEW YORK, N. Y.

DEVICE FOR SQUEEZING LIMES, LEMONS, &c.

SPECIFICATION forming part of Letters Patent No. 659,346, dated October 9, 1900.

Application filed March 2, 1900. Serial No. 7,050. (No model.)

*To all whom it may concern:*

Be it known that I, PATRICK KING, a citizen of the United States, and a resident of the city, county, and State of New York, have invented certain new and useful Improvements in Devices for Squeezing Limes, Lemons, and other Fruits, of which the following is a specification.

My invention relates to devices for squeezing limes, lemons, and other fruits.

The object of my improvements is to furnish a device by means of which the fruit can be instantly picked up and then the juice and seeds squeezed out of it and the squeezed fruit dropped, leaving the seeds behind.

My improved device is particularly adapted to drop separately into a glass or other vessel the juice and the skin of the fruit without dropping in the seeds. It, moreover, permits the fruit to be picked up, the seeds to be squeezed out, the juice to be meanwhile permitted to escape into a receiving vessel and the fruit itself to be dropped into the vessel without touching the fruit with the hands.

My invention consists in the devices and combinations of devices, as hereinafter described.

In the accompanying drawings I have shown one embodiment of my invention, in which—

Figure 1 illustrates the device with its jaws holding half of a fruit over a glass and the seed-tray in position between the glass and under the jaws and fruit to catch and hold the seeds when the fruit is squeezed by the jaws, the dotted lines in said figure indicating the proper position of the tray when still holding the seeds and when the squeezed fruit is to be dropped into the glass. Fig. 2 is a vertical section through 2 2 of Fig. 1, omitting the fruit.

Similar letters represent like parts in both figures.

A A are two crossed levers pivoted at *a*. The two arms of the levers on one side of the pivot *a* constitute jaws B B, and the opposite arms of said levers constitute handles C C. The inner surfaces of said jaws B B are grooved outwardly or toward their ends and diverging toward their sides, meeting at an angle about midway between their sides, all as shown at *b*.

D is a perforated tray concave on its upper side and pivoted to the end of one of the jaws B, as shown at *d*.

E is a coil-spring connecting the two handles C C and serving to normally keep said handles and the jaws B B apart. The jaws B B are preferably flat on their outer ends, as shown at *c*.

The above-described device may be used in the following manner: The lime, lemon, or other fruit is first cut and laid on the table or stand with the cut side down. The device is then taken up by the handles C C, the tray D swung to the position shown in dotted lines in Fig. 1, and the jaws B B are made to rest on their "square" or flat ends *c*, spanning the fruit. The jaws are then brought toward each other by the handles C C to grasp the fruit F, and the tray D is then swung under the fruit F, as shown in full lines in Fig. 1. The device is then held over the glass G, (see Fig. 1,) and the jaws B B are made to squeeze the fruit F by the handles C C. The seeds from the fruit will drop into the tray D, and the juice will pass through the perforations in the tray into the glass G, the seeds being left behind in said tray. The tray, with the seeds on it, is then swung out from under the fruit to the position shown in dotted lines in Fig. 1, the jaws C C are allowed to separate, and the squeezed fruit, minus the seeds, drops into the glass. The diverging and outwardly-extending grooves *b* constitute channels by which both the seeds and the juice from the fruit are freely guided from the jaws C C and also serve to more tightly grasp the fruit and prevent its slipping.

From the above it will be seen that the fruit can be grasped, and the fruit, minus the seeds, can in a moment be introduced separately into a vessel without removing the fruit and the squeezing device from above the vessel, thus saving much time and performing the above operations in a most complete manner.

What I claim as new, and desire to secure by Letters Patent, is—

1. In combination with the squeezing-jaws of a fruit-squeezing device, said jaws constructed when drawn together, to grasp and squeeze the fruit, and when separated to permit the fruit to drop from them, a tray loosely attached to one of said jaws and arranged to move sidewise to and from a position under said jaws.

2. In combination with the squeezing-jaws of a fruit-squeezing device, said jaws constructed when drawn together, to grasp and squeeze the fruit, and when separated, to permit the fruit to drop from them, a perforated tray loosely attached to one of said jaws and arranged to move sidewise to and from a position under said jaws.

3. In combination with the squeezing-jaws of a fruit-squeezing device, a perforated tray loosely attached to the free end of one of said jaws and constructed to move in a direction substantially at right angles with the same, under and away from the jaws.

4. In combination with the squeezing-jaws of a fruit-squeezing device, a perforated tray pivoted to the free end of one of said jaws and constructed to swing on its pivot in a direction substantially at right angles with the same under and away from the jaws.

5. In combination with the squeezing-jaws of a fruit-squeezing device, said jaws constructed when drawn together, to grasp and squeeze the fruit, and when separated, to permit the fruit to drop from them, a concave perforated tray loosely attached to one of said jaws and arranged to move sidewise to and from a position under said jaws.

6. In a fruit-squeezing device, the combination with the crossed levers having the squeezing-jaws at one end and a spring between said levers for normally keeping the jaws apart, a perforated tray loosely attached to the free end of one of said jaws and constructed to move in a direction substantially at right angles with the same under and away from the jaws.

7. In a fruit-squeezing device, the squeezing-jaws having their operating-faces provided with two sets of grooves extending from points between two opposite edges to said edges, and in a direction toward the free ends of the jaws.

8. In a fruit-squeezing device the squeezing-jaws having their operating-faces provided with a groove extending longitudinally between two opposite edges of the jaws and two sets of grooves extending from said longitudinal groove to said edges and in a direction toward the free ends of the jaws.

9. In a fruit-squeezing device, the combination with the squeezing-jaws having outwardly-extending grooves in their operating sides, a perforated tray loosely attached to the free end of one of said jaws, and constructed to move in a direction substantially at right angles with the same under and away from the jaws.

10. In a fruit-squeezing device, the combination with the squeezing-jaws having outwardly-extending and diverging grooves in their operating sides, a perforated tray loosely attached to the free end of one of said jaws, and constructed to move in a direction substantially at right angles with the same under and away from the jaws.

11. In combination with the squeezing-jaws of a fruit-squeezing device and having their free ends flat, a perforated tray loosely attached to the free end of one of said jaws, and constructed to move in a direction substantially at right angles with the same under and away from the jaws.

In testimony whereof I have signed my name to this specification in the presence of two subscribing witnesses.

PATRICK KING.

Witnesses:
EDWIN SEGER,
JOHN O. TEMPLER.